United States Patent [19]

Mettler et al.

[11] Patent Number: 5,703,973
[45] Date of Patent: Dec. 30, 1997

[54] OPTICAL INTEGRATED CIRCUIT HAVING PASSIVELY ALIGNED FIBERS AND METHOD USING SAME

[75] Inventors: Stephen Clement Mettler, Decatur; Ian Arthur White, Dunwoody, both of Ga.

[73] Assignee: Lucent Technologies Inc., Murray Hill, N.J.

[21] Appl. No.: 625,467

[22] Filed: Mar. 29, 1996

[51] Int. Cl.$^6$ .................................................. G02B 6/12
[52] U.S. Cl. .............................. 385/14; 385/49; 385/50; 385/52
[58] Field of Search .............................. 385/14, 49, 50, 385/51, 52, 55, 59, 64, 65, 71, 82, 83, 88, 89, 91, 97, 98, 136, 137, 132

[56] References Cited

U.S. PATENT DOCUMENTS

| | | | |
|---|---|---|---|
| 3,871,935 | 3/1975 | Gloge et al. | 156/158 |
| 4,639,074 | 1/1987 | Murphy | 385/49 X |
| 4,772,086 | 9/1988 | Bellerby et al. | 385/49 X |
| 4,818,058 | 4/1989 | Bonnani | 385/55 X |
| 4,818,059 | 4/1989 | Kakii et al. | 385/83 X |
| 4,973,126 | 11/1990 | Degani et al. | 385/55 X |
| 5,259,049 | 11/1993 | Bona et al. | 385/50 |
| 5,432,878 | 7/1995 | Smous | 385/52 |
| 5,482,585 | 1/1996 | Ota et al. | 385/49 X |
| 5,555,333 | 9/1996 | Kato | 385/89 |

OTHER PUBLICATIONS

Murphy, et al., "Permanent Attachment Of Single–Mode Fiber Arrays To Waveguides", Journal Of Lightwave Technology, vol. LT–3, No. 4, Aug., 1985.

*Primary Examiner*—Brian Healy
*Attorney, Agent, or Firm*—Michael A. Morra

[57] ABSTRACT

An optical integrated circuit (OIC) 10 and an optical fiber array 20 are joined using index matching material, and mounted on a planar bridging structure 30 to form a device which can be readily connected to other devices using conventional optical connectors. The OIC and the fiber array comprise a silicon substrates 100, 200 having bottom surfaces that include reference areas 14, 24, and top sides that include a number of optical paths 16, 50. These paths are positioned above each reference area by an exact distance. Additionally, the bottom sides of the OIC and the fiber array include alignment features 13, 23 which are etched into their substrates and bear a predetermined horizontal relation to the optical paths. The planar bridging structure also includes a reference surface 34 that interfaces the reference surfaces of the OIC and the fiber array to assure that the optical paths are in vertical alignment. The resulting device achieves excellent alignment (i.e., less than 0.1 dB loss on average), without active alignment, when the fibers in the fiber array are carefully selected to have minimum eccentricity and similar diameters. The overall device is structurally completed by placing a bridging substrate 400 on the top surfaces of the OIC and the fiber array and then attaching a pair of spring clips 60 to support them as a unitary structure.

19 Claims, 5 Drawing Sheets

OPTICAL INTEGRATED CIRCUIT HAVING PASSIVELY ALIGNED FIBERS AND METHOD USING SAME

TECHNICAL FIELD

This invention is related to an optical integrated circuit (OIC) that is interconnected to an optical fiber array. This invention is also related to a method for accurately achieving passive alignment between the fiber array and the OIC.

BACKGROUND OF THE INVENTION

Optical integrated circuits (OICs) comprise devices such as 1×N splitters, switches, wavelength division multiplexers, etc. that are deposited on a planar substrate (e.g., a "chip") and interconnected by waveguides. These waveguides, in turn, are nothing more than optical paths that are deposited on the chip and are made from glass, or other transmissive media such as optical polymers, having a slightly higher index of refraction than the chip in order to guide light. OICs are increasingly being used to implement their discrete optical counterparts because they are more compact, reliable and durable; and because optical device integration allows precise component configurations to be repeatably manufactured.

The interconnection of optical fibers to the waveguides on the OIC is one of the major problems frustrating the widespread application of OICs. Only two different classes of alignment strategy appear to exist:

i) Active alignment wherein the optical fibers are actively aligned to the planar waveguides while monitoring the optical transmission of the connection visually or observing the relative positions of the waveguide cores; and ii) Passive alignment wherein the optical fibers are somehow positioned relative to the waveguides without monitoring the optical transmission of the connection.

It is generally accepted that active alignment procedures produce lower loss interconnections, but result in a higher cost per interconnection. Moreover, there has been no successful demonstration of a high performance, low loss, environmentally stable passive alignment strategy for OICs. Previous attempts at passive alignment consist of a connection which required a very large number of piece parts that were not suited to manufacture. Physical alignment features that have been fabricated on the top surface of the chip, typically less than 10 μm, are not very reliable for positive registration—particularly if manual assembly is desired.

What is needed is an OIC that is connected to a plurality of optical fibers, wherein the optical fibers provide access to circuits on the OIC. The connections should exhibit low loss and be environmentally stable. Moreover, the quality of these interconnections should be achieved manually, and without having to monitor the optical transmission of the connection.

SUMMARY OF THE INVENTION

An optical integrated circuit (OIC) and an optical fiber array are joined end-to-end and mounted on a planar bridging structure to form a device which can be readily connected to other devices using conventional optical connectors. The OIC and the fiber array each comprise a substrate having a bottom side that includes a reference surface, and a top side that includes a number of optical paths. These paths are positioned above each reference surface by an exact distance. Additionally, the bottom sides of the OIC and the fiber array include alignment features which are etched into the substrate and which have a fixed horizontal relation to the optical paths. The planar bridging structure also includes a reference surface that interfaces the reference surfaces of the OIC and the fiber array to assure that the optical paths are in vertical alignment. Moreover, the planar bridging structure includes complementary features that engage the alignment features of the OIC and the fiber array to assure that the optical paths are in vertical alignment.

In a preferred embodiment of the invention, silicon is used as the substrate material although glass may be used as well. The resulting device achieves excellent alignment (i.e., less than 0.1 dB loss—on average), without active alignment, when the fibers in the fiber array are carefully selected to have minimum eccentricity (e.g., less than 0.15 microns) and similar diameters (e.g., within 0.3 microns). The overall device is structurally completed by placing another bridging structure on the top sides of the OIC and the fiber array, applying an index matching material between the fiber ends and the waveguides, and then attaching one or more mechanical clamps.

BRIEF DESCRIPTION OF THE DRAWINGS

The present invention, as defined in the claims, can be better understood when reference is made to the following drawings. These drawings are not necessarily to scale, emphasis instead being placed upon clearly illustrating the principles of the present invention.

DETAILED DESCRIPTION

The present invention represents an improvement in the art of connecting optical fibers to an optical integrated circuit (OIC) so that circuits on the OIC, such as splitters and WDMs, can be easily accessed. Heretofore, it has been necessary to actively align the interconnection between the optical fibers and the waveguides on the OIC in order to have a low-loss connection. The present invention eliminates the capital cost of an alignment station, discussed below in connection with FIG. 7, and the labor cost for the time spent (approximately 30 minutes) during the alignment and curing processes. In general, the present invention achieves comparable or better performance via precision thickness silicon piece parts, precision photolithography, and precision optical fibers. Indeed, precision in each of these areas has already been demonstrated, but never in combination to achieve passive alignment, and its associated cost savings, in connecting optical fibers to an OIC.

Figure 1:
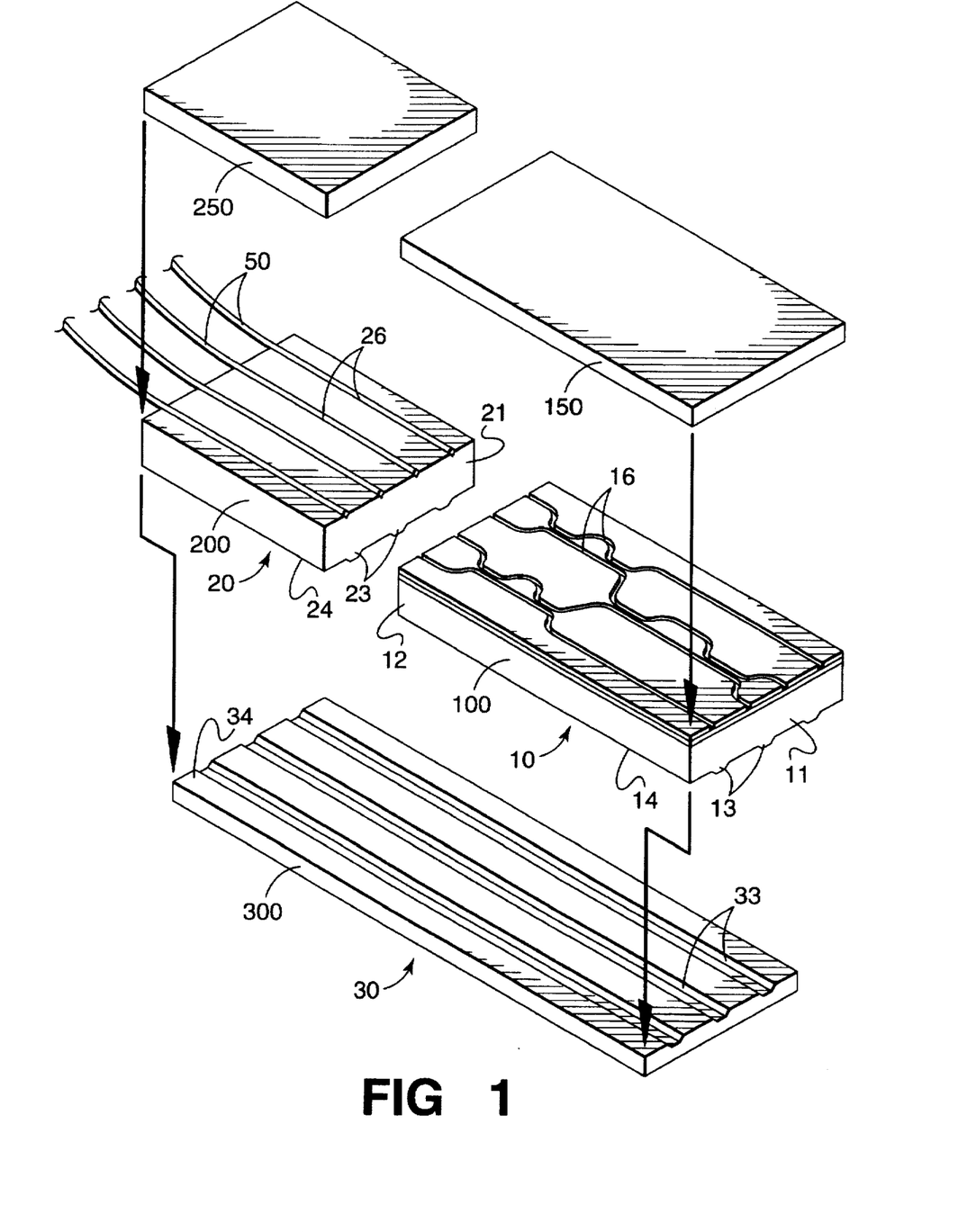
FIG. 1 is an exploded perspective view of a fiber array, an optical integrated circuit (OIC), and a bridging structure for interconnection in accordance with the invention.

FIG. 1 is an exploded perspective view of a fiber array 20 and an OIC 10 whose interconnection is supported by bridging structure 30. The fiber array 20 comprises a silicon substrate 200 having a plurality of longitudinally extending troughs 26 on its top side. Each trough holds an optical fiber 50 whose protective coating has been stripped from its end portion. (It is noted that optical fibers are typically coated with one or more layers of an acrylate material, which protect the glass from contaminants and abrasion.) In cross section, trough 26 is V-shaped and is readily formed by machining, or preferably, for manufacturing economy, by etching. The dimensions of trough 26 are selected such that when the stripped glass fiber 50 is properly seated within the trough, the top of the fiber extends slightly above the top of the trough. That is, if the top of fiber 50 lies below the top of trough 26, then the protective cover 250 (see FIG. 4) will be unable to exert any force on the fiber, and the protective cover will be ineffective to hold the fiber securely within the trough. Moreover, if the top of the fiber is merely even with the top of the trough, contact with the protective cover is possible, but such contact may be frustrated by the presence of dust particles between the protective cover 250 and the top side of substrate 200.

Figure 4:
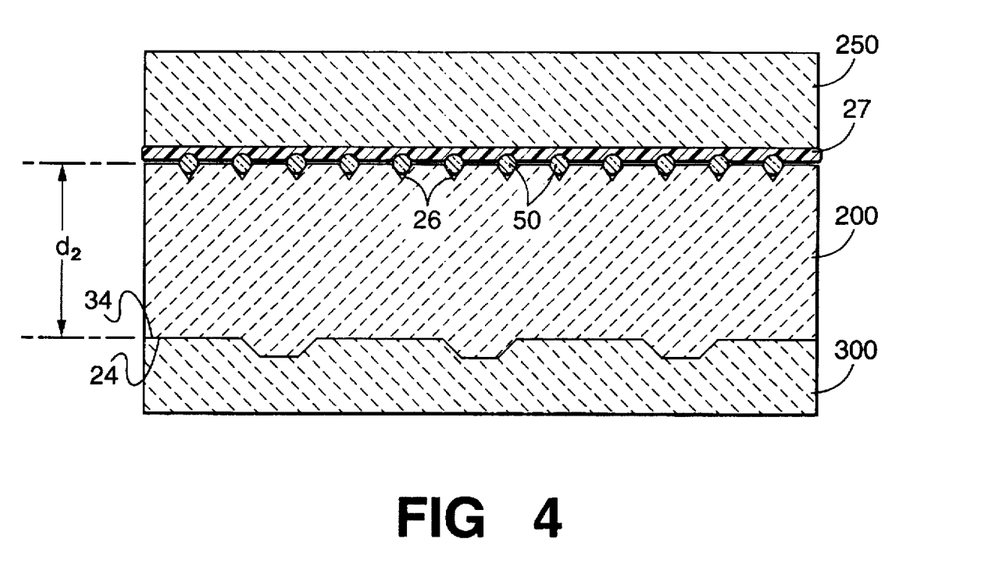
FIG. 4 is a cross-section view of the fiber array mounted on the bridging structure.

After the fibers 50 are positioned in the troughs 26, a top cover 250 is used to hold them in place. As shown in FIG. 4, a compliant adhesive material 27 is applied to underside of cover 250 that bonds the cover to the fiber array 20 and holds the optical fibers 50 in place without imparting undue stress. Optical fibers that extend beyond an end face 21 of the array 20 are cleaved, and the entire end face is polished. Preferably, the end face 21 is polished at an angle greater than 6°, and preferably between 8°–12°, relative to a direction normal to the major surface of the silicon substrate 200, to reduce back reflection.

Figure 5:
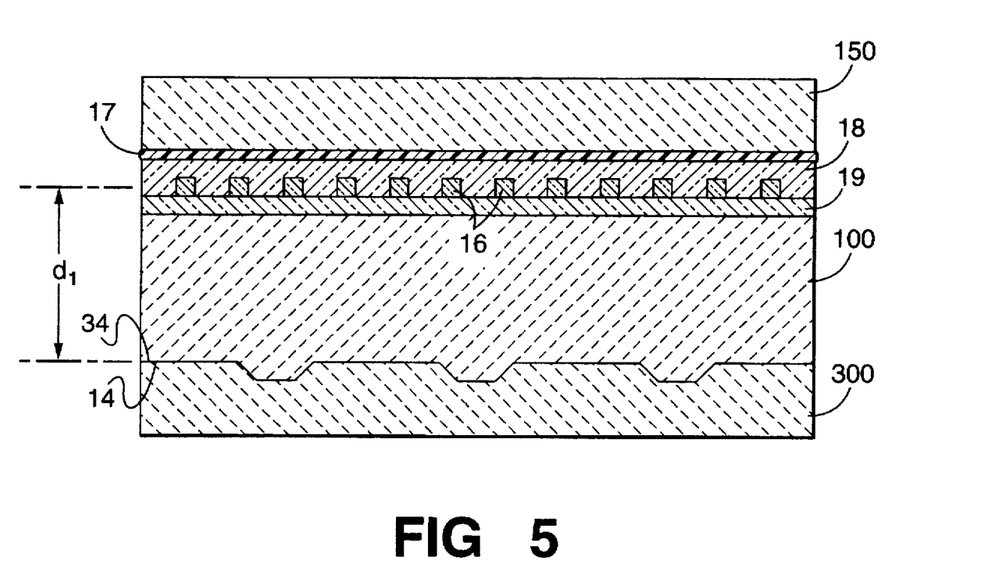
FIG. 5 is a cross-section view of the OIC mounted on the bridging structure.

OIC 10 comprises a silicon substrate 100 having a number of optical circuits formed thereon. Optical waveguides 16 serve to guide optical signals to and from these optical circuits. The optical waveguides 16 comprise paths, deposited on the substrate 100, that are made from a glass having an index of refraction that is slightly higher than the surrounding material in order to guide light. Because sharp turns in these paths cause some light to escape from the waveguide, sharp turns are generally avoided unless it is desirable, for example, to couple light to another waveguide. Groups of optical circuits are deposited on a large silicon substrate and then separated from each other by dicing. Preferably, before dicing, a protective plate 150, made from silicon or other suitable material, is adhered to the substrate 100. Importantly, the protective plate 150 has a thermal coefficient of expansion substantially the same as substrate 100. As shown in FIG. 5, an adhesive 17 such as epoxy is applied between the protective plate 150 and the substrate 100. After the adhesive has hardened, the substrate 100 and the protective plate 150 are diced into separate OIC assemblies. And, as with the above-described fiber array, end face 12 of the OIC is polished at an angle greater than 6°, and preferably between 8°–12°, relative to a direction which is normal to the major surface of the silicon substrate 100 in order to reduce back reflection. However, end face 12 tilts in a direction which is opposite to that of end face 21. This is to assure that these end faces, when abutted together, will touch each other at all points on their respective surfaces. An index-of-refraction matching material such as GE 6186 is applied to the interface between these end faces 12, 21 to accommodate imperfections.

It is noted that the other end face 11 of the OIC is handled in much the same way as end face 12. And while no fiber array is shown connected to end face 11 to simplify the drawing and avoid redundancy, it is understood that the optical waveguides 16 which extend to end face 11 either connect to a fiber array (similar to fiber array 20) or to another OIC.

Horizontal Alignmment

Still referring to FIG. 1, bridging device 30 comprises a silicon substrate 300 having a number of features 33, which enable horizontal alignment, on its top side. Complementary features 13, 23 exist on the bottom sides of OIC 10 and fiber array 20 respectively so that when all three structures 10, 20, 30 are joined together, the fibers within the fiber array 20 will be horizontally aligned with respect to the waveguides 16 on the OIC. So that manual assembly is possible, the size of these features needs to be on the order of 50 to 75 microns (where 1 micron=$10^{-6}$ meters=1 μm) to ensure positive registration of this feature by touch. (Machine vision can be used to decrease the needed feature size, but with the added cost of automation.) And while it is preferable that these features be etched or machined into the silicon substrate, material may be deposited onto the substrate to achieve the same purpose.

In order for the alignment features to assure correct horizontal registration, the ones formed on the bottom side of the OIC substrate must establish the horizontal location of the optical waveguides on its top side to within 0.5 micron. This can be achieved via double-sided photolithography and etching techniques which are known in the art. Similarly, double-sided photolithography and etching are used to establish the horizontal location of the optical waveguides on the fiber array substrate to within 0.5 micron.

Vertical Alignment

The top side of bridging device 30 includes a reference surface 34 that enables vertical alignment. Reference surface 34 mates respectively with reference surfaces 14, 24 on the OIC and fiber array substrates to assure that the fibers in fiber array 20 will be vertically aligned with respect to the waveguides 16 in OIC 10.

Reference is briefly made to FIG. 4 which shows a distance $d_2$ (typically between 20–40 mils) that is measured between reference surface 24 and a plane that cuts through the central axes of optical fibers 50. Although not required in practicing the present invention, the troughs 26 are etched such that the central axes of the optical fibers 50 residing therein are all in the same plane as the top side of substrate 200. Reference is also briefly made to FIG. 5 which shows distance $d_1$ between reference surface 34 on the bottom side of OIC substrate 100 and a plane which cuts through the central portion of the optical waveguides 16 therein. Although the exact dimensions of $d_1$ and $d_2$ are preferably about 30 mils each (i.e., 0.76 millimeters), the more important specification is that $d_1=d_2\pm0.5$ microns.

Figure 2:
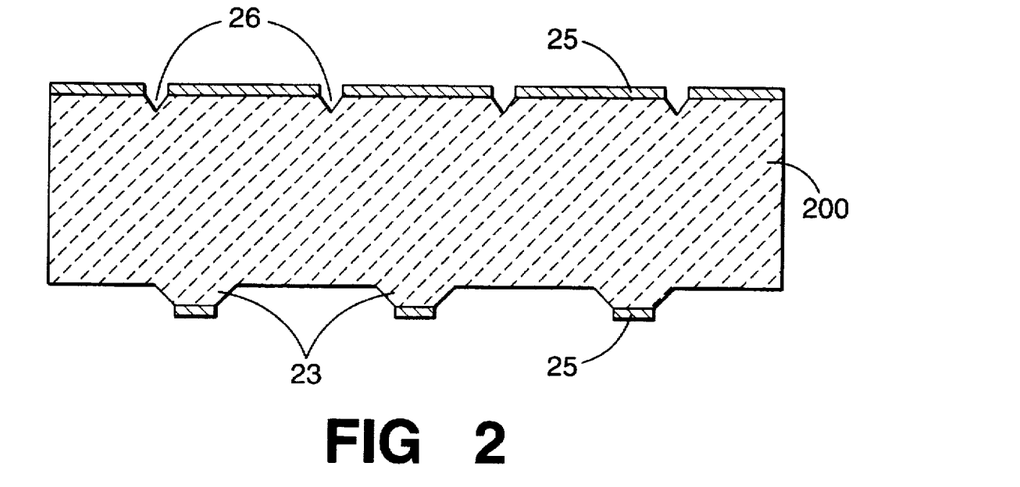
FIG. 2 discloses a cross-section view of a planar glass substrate, used in the fiber array, during a stage of fabrication.

FIG. 2 discloses a cross-section view of a planar glass substrate 200 during a stage of fabrication. This substrate is used in constructing the optical fiber array and is desirably made from a crystal material such as silicon. The top surface includes an array of V-shaped troughs 26, etched therein, for holding optical fibers. The bottom surface includes an array of alignment features 23 which are also formed by etching. Mask material 25 is deposited onto the silicon substrate, and then is selectively removed using known etching and photolithographic techniques. It is critical that the troughs 26 and alignment features 23 be precisely positioned with respect to each other in the horizontal direction so that horizontal alignment of the assembly shown in FIG. 1 will be accurate. Once the horizontal relationship is established between the troughs and alignment features, it is maintained to within ±0.5 microns. Note that while multiple alignment features 23 are shown, only one is needed. And while longitudinal protrusions on the bottom side of a silicon substrate are preferred, other kinds of features in or on the substrate may be used as long as they bear a precise horizontal relation to the troughs 26 which hold the optical fibers.

Use of a crystal, such as silicon, for the substrate material permits taking advantage of certain crystal planes to precisely form the trough surfaces. For example, a silicon substrate with a major surface in the (1,0,0) crystallographic plane will be etched anisotropically to form troughs with surfaces lying in the (1,1,1) planes. Therefore, the angle of the two sloping walls of a trough will always be precisely determined by the orientation of the crystal planes (in this example, approximately 55°) with respect to the major structure regardless of the time of etching the major surface. The size of the opening will therefore primarily be determined by the size of the openings in the etch mask. Troughs with flat bottoms are formed by stopping the etch process short of a complete etching of the crystal planes. Nevertheless, sloping sidewalls with the same orientation will still be produced. Crystallographic etching is discussed, for example, by E. J. Murphy et al., "Permanent Attachment of Single-Mode Fibers to Waveguides," *Journal of Lightwave Technology*, Vol. LT-3, No. 4 (1985).

Fiber Selection

It is desirable to achieve a low-loss connection between the optical fibers of the fiber array and the waveguides deposited on the OIC. This connection is accomplished by butting each optical fiber up against each waveguide. Ideally, the longitudinal axis of each fiber is collinear with the longitudinal axis of each waveguide. This is accomplished, in part, by selecting optical fibers that have identical outside diameters and minimum eccentricity. And while this may seem expensive, it is not. When optical fiber is manufactured, measurements are made regarding outside diameter and eccentricity. These and other measurements are associated with each spool of fiber. And since each OIC only needs about one meter of fiber to make all connections, one spool of carefully selected fiber is adequate for thousands of OICs. Moreover, the fiber-making process is sufficiently well understood that the outside diameter and eccentricity of the fiber can be tightly controlled—albeit at increased cost.

Figure 3:
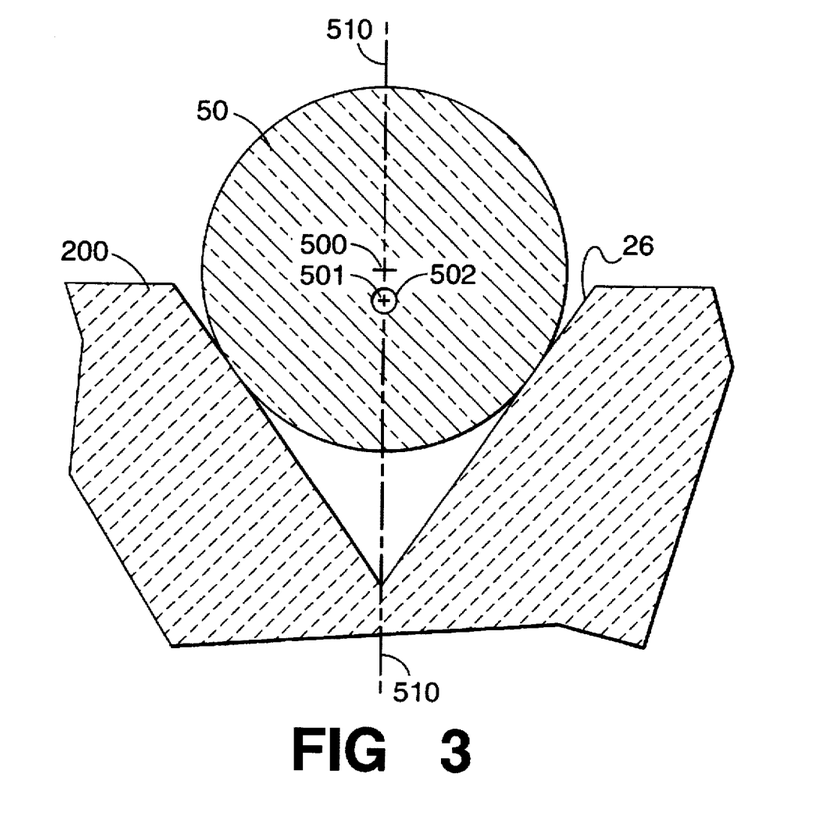
FIG. 3 is a cross-section view of an optical fiber residing within a V-shaped support trough in the fiber array, the distance between the longitudinal axis of the fiber and the central axis of its light-carrying core being exaggerated for clarity.

Illustrating the required accuracy insofar as the outer diameter of a fiber is concerned, reference is now made to FIG. 3 which is a cross-section view of an optical fiber 50, whose outer coating has been removed, residing within a V-shaped support trough 26 in the top side of substrate 20. The geometric center 500 of optical fiber 50 resides on line 510 which passes through the very bottom of the support trough 26. Optical fibers used for communications include a light-carrying core 502 and a cladding disposed thereabout. Such optical fibers have a nominal outer diameter of 125 microns; and in the case of singlemode fibers, the core diameter is about 9 microns. Increases and decreases in the diameter of optical fiber 50 cause its geometric center 500 to respectively move up and down along line 510 by a proportional amount. Since the waveguides that are to be aligned with the cores 502 of the optical fibers have comparable thickness, then the optical transmission loss that results from changes in the outer diameter of the optical fiber are about 0.1 dB for a change in outer diameter of about 1.0 micron. Accordingly, it is desirable that the outer diameter of the optical fiber be 125±0.3 microns for proper passive alignment.

FIG. 3 also illustrates the required accuracy insofar as the eccentricity of a fiber is concerned. Note that the light-carrying core 502 of fiber 50 has a center 501 which is different than the center 500 of the fiber. Moreover, depending on how the fiber is rotationally positioned within V-shaped trough 26, the center 501 of the core may be to the left or right of line 510. The distance between centers 500 and 501 is known as its eccentricity, which in typical production fibers may be about 1 micron. However, for proper passive alignment, it is necessary to select an optical fiber whose eccentricity is less than 0.15 micron for proper passive alignment.

FIGS. 4 discloses a cross-section view of the fiber array substrate 200 mounted on the bridging structure substrate 300. A layer of compliant material 27 is attached to the bottom side of protective cover 250 and used to press each of the fibers 50 into an associated V-shaped trough 26. The compliant material illustratively comprises a sheet of plastic such as polycarbonate. Reference surface 24 on substrate 200 mates with reference surface 34 on substrate 300 to assure that the central axes of the fibers 50 are a precise distance $d_2$ above the bridging substrate to assure precise vertical alignment with the waveguides 16 shown in FIG. 5.

FIG. 5 discloses a cross-section view of OIC substrate 100 mounted on the same bridging substrate 300 as shown in FIG. 4. A layer of epoxy 17 is used to attach protective cover 150 to the OIC substrate 100. Optical waveguides 16 are formed from three layers: base 19, core 16, and cladding 18. The base layer 19 separates the fundamental mode from the silicon substrate 100 and thereby prevents optical signals from leaking through the silica-substrate interface, which, unlike other waveguide interfaces, is not totally reflecting. The refractive index of the cladding layer 18 is chosen to be nearly equal to that of the base layer 19. To achieve optical confinement, the refractive index of core layer 16 is increased by a small amount. This is normally described as Δ—the percentage increase in refractive index of the core, relative to the cladding. With a P-doped core, Δ~0.60–0.70%. Increasing Δ produces a smaller optical mode, a smaller bend radius, a more compact OIC, and an increased loss. The base layer 19 is made from undoped silica ($SiO_2$). This is the most rigid layer and it keeps the cores 16, which are adhered to it, from moving after it is patterned. The other glasses are made from doped silica and are flowed during annealing, a process that helps to form homogeneous low-loss material. To promote filling between closely spaced cores, the cladding should flow readily while the core and base layer remain rigid. The cladding should also match the base layer in refractive index. As discussed hereinbefore, $d_1=d_2$ to within ±0.5 microns in order to assure that the optical waveguides 16 will be vertically aligned with optical fibers 50 (FIG. 4) after they are mechanically joined as shown in FIG. 6.

Figure 6:
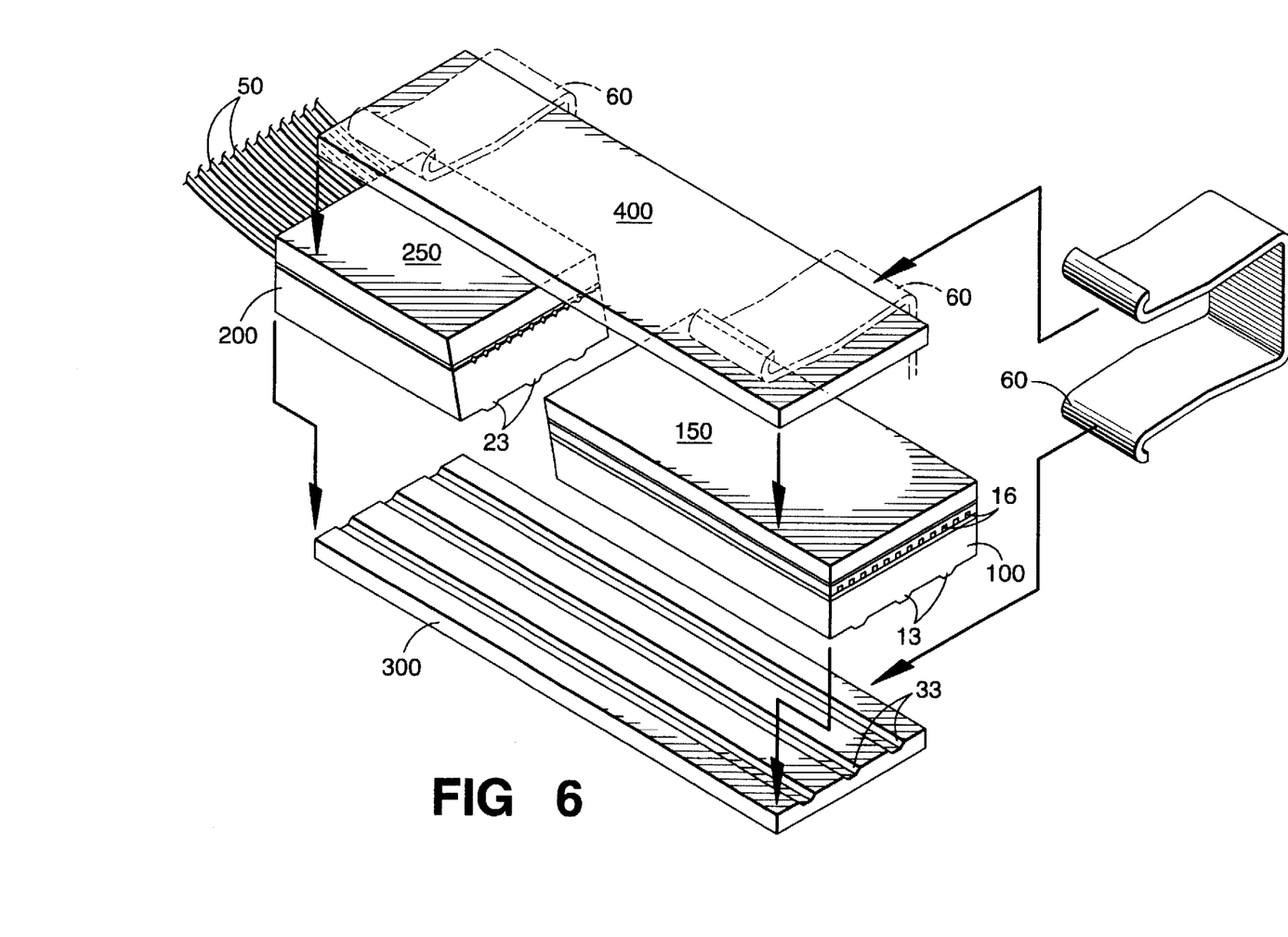
FIG. 6 is a perspective view of an interconnection assembly, including the OIC and the fiber array that are passively aligned.

FIG. 6 shows the OIC substrate 100 and its protective cover 150 interconnected with fiber array substrate 200 and its protective cover 250. By properly controlling the thickness of the substrates 100, 200; the alignment features 13, 23, 33; and the diameter and eccentricity of optical fibers 50, excellent passive alignment is achieved at low cost. The bottom bridging structure 300 cooperates with a top bridging structure 400 to sandwich the OIC and the fiber array, while a pair of spring clips 60 holds the entire assembly together as a unitary structure. Preferably, the spring clips are made from stainless steel. Advantageously, such assemblies do not require a laboratory environment but, instead, can be put together in the field. The end faces of the OIC and the fiber array are pre-polished; and by applying index matching material to their interface during assembly, minor abrasions are overcome.

Active Alignment via Transmission Power Monitoring

Figure 7:
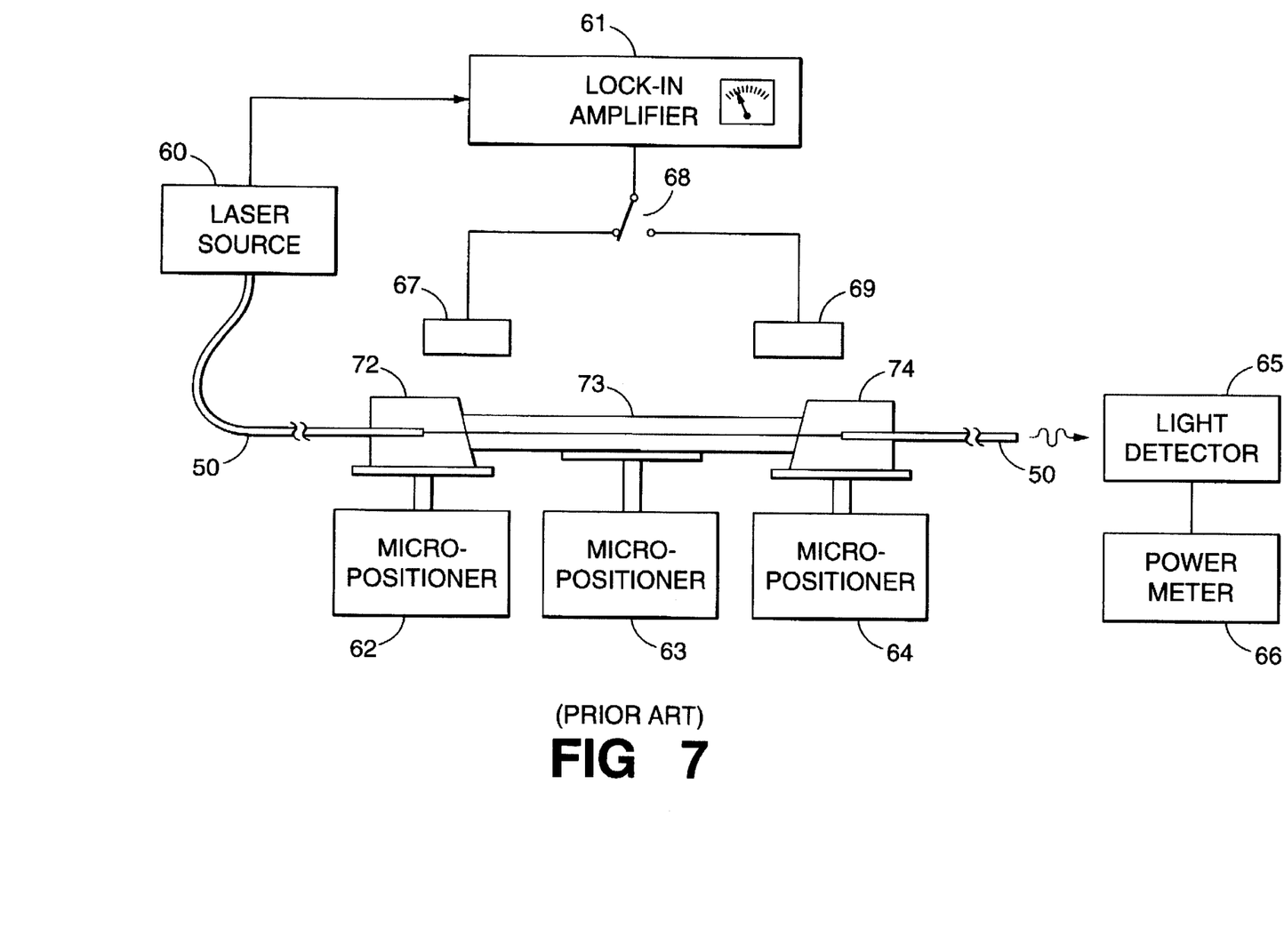
FIG. 7 is a block diagram and side view of a prior-art apparatus for actively aligning optical waveguide ends of an OIC assembly with the optical fiber ends of an optical fiber array.

Disclosed in FIG. 7 is an apparatus for aligning optical fibers 50 in the optical fiber arrays 72, 74 to the optical waveguides of the OIC 73. Adhesive, preferably a UV-curable variety, is applied to one or both ends of the OIC 73 and/or the opposing of respective optical fiber arrays 72, 74. In FIG. 7, the OIC 73 and the optical fiber arrays 72, 74 are mounted in respective micropositioners 62, 63 and 64 which are commercially available from Melles-Griot, Inc. of Cambridge, England. Preferably, the micropositioner 63 is a roll-stage capable of rotating about a horizontal axis that extends from the left-hand side of FIG. 7 to its right-hand side; or in other words, an axis parallel to the length of the OIC 73. The micropositioners 62, 64 are preferably x-y-z stages capable of finely positioning respective optical fiber arrays 72, 74 in three dimensions.

A laser source 60 is coupled to the ends of the optical fibers 50 and can selectively generate laser light in any selected optical fiber 50. The laser source 60 intensity-modulates the laser light at a predetermined frequency and generates an electric signal indicative of the modulation frequency of the laser light. The laser source 60 is coupled to provide the electric signal indicating the modulation frequency of the laser light, to the lock-in amplifier 61. The laser light generated by laser source 60 passes through a selected optical fiber 50 to the optical fiber/adhesive/optical waveguide interface between the optical fiber array 72 and the end of the OIC 73 in contact with it. Laser light scattered from the optical fiber/adhesive/optical waveguide interface is detected by a light detector 67 which is disposed in proximity to said interface. Light detector 67 generates a signal, based on the magnitude of the scattered light, that is supplied to lock-in amplifier 61 via switch 68. Preferably, the laser source 60 modulates laser light at a frequency which is not significantly present in room light, e.g., 2 kHz.

Lock-in amplifier 61 receives the electric signal generated by the laser source 60, and used this signal to detect only light generated by the laser source 60. Based on the amount of laser light scattered from the optical fiber/adhesive/optical waveguide interface detected by the light detector 67, the lock-in amplifier generates a display 610 that is indicative of the amount of the scattered light. By manipulating the micropositioner 62 and monitoring the display 610 a until the light scattered from the optical fiber/adhesive/optical waveguide interface is a minimum, the selected optical fiber 50 can be aligned with one corresponding waveguide on OIC 73. Micropositioner 63 is manipulated by rotating the roll-stage of the micropositioner 63 about an axis defined by the aligned optical fiber and optical waveguide until the light scattered by the optical fiber/adhesive/optical waveguide interface is a minimum. Switch 68 is then manually operated to supply a light signal generated by a light detector 69 to the lock-in amplifier 61. The signal generated by the light detector 69 is based on the scattered light received from the optical waveguide/adhesive/optical fiber interface between the optical fiber array 74 and the end portion of the OIC 73 in contact with it. The above-described alignment procedure is repeated for this interface. After the optical fiber arrays 72, 74 and the OIC 73 have been aligned, the adhesive (which is UV curable) is irradiated with ultraviolet light to harden and thereby maintain alignment.

Light detector 65 generates a signal which is indicative of the intensity of laser light transmitted through the interconnection assembly 72, 73, 74. A power meter 66 coupled to the light detector 65, can be used to determine and display the intensity of the laser light transmitted through the interconnection assembly. By comparing the intensity of the laser light generated by the laser source 60 with the intensity of the laser light received at the power meter 66, the quality of the interconnection assembly can be determined and indicated with a label placed on or associated with the interconnection assembly to allow technicians or service persons, for example, to readily determine whether the interconnection assembly is of a quality suitable for a particular application.

We claim:

1. In combination:
   an optical integrated circuit (OIC) comprising a substrate having a reference surface on its bottom side and a plurality of waveguides on its top side, said waveguides having central axes that reside in a plane that is positioned above the reference surface by an exact predetermined distance, the bottom side of the OIC having an alignment feature for fixing the lateral position of the waveguides;
   a fiber array comprising a substrate having a reference surface on its bottom side and a plurality of troughs containing optical fibers on its top side, said optical fibers having central axes that reside in a plane that is positioned above the reference surface by said exact predetermined distance, the bottom side of the fiber array having an alignment feature for fixing the lateral position of the optical fibers; and
   a first planar bridging structure having a reference surface on its top side that engages the reference surfaces of the OIC and the fiber array, and holds the waveguides and optical fibers in vertical alignment, the top side of said planar bridging structure having complementary alignment features that engage the alignment features of the OIC and the fiber array and hold them in lateral alignment.

2. The combination of claim 1 wherein the optical fibers have diameters that are identical ±0.3 microns.

3. The combination of claim 1 wherein the optical fibers have an eccentricity that is less than 0.15 microns.

4. The combination of claim 1 wherein the exact predetermined distance has a tolerance of ±0.5 microns.

5. The combination of claim 1 further including index-matching material at the junction between the optical fibers and the optical waveguides.

6. The combination of claim 1 wherein the OIC includes a protective cover that is adhesively attached to its top side, said protective cover having a thermal coefficient of expansion which is substantially equal to the thermal coefficient of expansion of the substrate used in the OIC.

7. The combination of claim 1 wherein the fiber array includes a protective cover that is adhesively attached to its top side, said protective cover having a thermal coefficient of expansion which is substantially equal to the thermal coefficient of expansion of the substrate used in the fiber array.

8. The combination of claim 1 further including a second planar bridging structure, mounted above the top sides of the OIC and the fiber array, that cooperates with the first planar bridging structure to sandwich the OIC and the fiber array therebetween.

9. The combination of claim 8 further including a holding means for supporting the OIC, the fiber array, and the first and second bridging structures as a unitary structure.

10. The combination of claim 9 wherein the holding means comprises a spring clip.

11. The combination of claim 1 wherein the troughs in the top side of the fiber array comprise grooves that have been crystallographically etched in the substrate.

12. The combination of claim 1 wherein the alignment features in the bottom sides of the OIC and the fiber array comprise longitudinal grooves that have been crystallographically etched in their substrates.

13. The combination of claim 1 wherein the complementary alignment features in the top side of the first planar bridging structure comprise longitudinal grooves that have been crystallographically etched in its substrate.

14. The combination of claim 1 wherein the optical fibers comprise end portions of coated optical fibers whose protective coatings have been removed.

15. An interconnection assembly comprising first and second optical components having bottom sides that are mounted on the top side of a planar bridging structure, each component comprising a silicon substrate having a reference surface on its bottom side and a plurality of optical paths on its top side, said optical paths having central axes that reside in a plane which is positioned above the reference surface by a predetermined distance;

the planar bridging structure having a reference surface on its top side that engages the reference surfaces of the first and second components and supports them in vertical alignment;

CHARACTERIZED IN THAT:

the first optical component comprises an optical integrated circuit having a plurality of passive optical circuits deposited on the top side of the silicon substrate, access to said optical circuits being provided by waveguides, also deposited on the top side of the silicon substrate, that extend from the optical circuit to a side edge of the substrate;

each component further includes an alignment feature on its bottom side, said alignment feature having a predetermined horizontal relation to the optical paths; and the planar bridging structure further includes complementary alignment features that engage the alignment features of the first and second components and support them in horizontal alignment.

16. The interconnection assembly of claim 15 wherein the second optical component comprises a fiber array having a plurality of troughs containing optical fibers on its top side that extend to a side edge of the substrate.

17. The interconnection assembly of claim 15 wherein the first and second optical components each comprise a fiber array having a plurality of troughs containing optical fibers on its top side that extend to a side edge of the substrate.

18. A method for providing accurate passive alignment between an optical integrated circuit (OIC) and a fiber array, both mounted on a bridging structure, said OIC comprising a silicon substrate having a plurality of longitudinally extending optical waveguides deposited on a top side thereof, said fiber array comprising a silicon substrate having an equal plurality of optical fibers disposed in longitudinally extending troughs on a top side thereof, said bridging structure comprising a planar silicon substrate, the method including the following steps:

forming an alignment feature on the bottom side of the OIC substrate that establishes the horizontal location of the optical waveguides to within 0.5 microns;

forming a reference surface on the bottom side of the OIC substrate that is a first predetermined distance below a plane that passes through the central axes of the optical waveguides;

forming an alignment feature on the bottom side of the fiber array substrate that establishes the horizontal location of the optical fibers to within 0.5 microns;

forming a reference surface on the bottom side of the fiber array substrate that is a second predetermined distance below a plane that passes through the central axes of the optical fibers, said first and second predetermined distances being equal to each other within 0.5 microns;

forming alignment features on a top side of the bridging structure substrate that are complementary to the alignment features on the bottom sides of the OIC and the fiber array substrates;

selecting the optical fibers for disposition in the troughs of the fiber array having outside diameters that are equal to a predetermined diameter ±0.3 microns; and narrowing the selection of optical fibers to ones having an eccentricity which is less than 0.15 microns.

19. The method of claim 18 wherein the steps of forming alignment features comprises etching along crystallographic planes of the silicon substrate.

* * * * *